United States Patent
Prehofer

(10) Patent No.: US 11,400,957 B2
(45) Date of Patent: Aug. 2, 2022

(54) CONTROL DEVICE AND CONTROL METHOD OF VEHICLE ENVIRONMENT DATA TRANSMISSION

(71) Applicant: DENSO CORPORATION, Kariya (JP)

(72) Inventor: Christian Prehofer, Eching (DE)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 16/988,616

(22) Filed: Aug. 8, 2020

(65) Prior Publication Data
US 2021/0046950 A1 Feb. 18, 2021

(30) Foreign Application Priority Data

Aug. 16, 2019 (DE) .......................... 102019212312.0

(51) Int. Cl.
| | | |
|---|---|---|
| *B60W 60/00* | (2020.01) | |
| *H04W 4/44* | (2018.01) | |
| *H04W 4/38* | (2018.01) | |
| *G08G 1/00* | (2006.01) | |

(52) U.S. Cl.
CPC ............. *B60W 60/001* (2020.02); *G08G 1/20* (2013.01); *G08G 1/22* (2013.01); *H04W 4/38* (2018.02); *H04W 4/44* (2018.02); *B60W 2420/42* (2013.01); *B60W 2556/45* (2020.02)

(58) Field of Classification Search
CPC ....... B60W 60/001; H04W 4/38; H04W 4/44; G08G 1/20; G08G 1/22
See application file for complete search history.

(56) References Cited

U.S. PATENT DOCUMENTS

| 6,707,421 | B1 | 3/2004 | Drury et al. |
| 6,812,888 | B2 | 11/2004 | Drury et al. |
| 2003/0055666 | A1* | 3/2003 | Roddy ................... G07C 5/008 |
| | | | 705/305 |
| 2009/0030605 | A1* | 1/2009 | Breed .................. G05D 1/0274 |
| | | | 340/901 |

(Continued)

FOREIGN PATENT DOCUMENTS

| DE | 19513640 A1 | 6/1996 |
| DE | 102011106295 A1 | 1/2012 |

(Continued)

*Primary Examiner* — Peter D Nolan
*Assistant Examiner* — Wae L Louie
(74) *Attorney, Agent, or Firm* — Maschoff Brennan

(57) ABSTRACT

A technology of controlling vehicle environment data transmission between a vehicle and a server is configured to receive mode information determining a mode among a monitoring mode, an urgency mode, or an efficiency mode. When determined to be operated in the monitoring mode, a control command for instructing the vehicle to perform a continuous monitoring or a regular monitoring of an environment of the vehicle is generated. When determined to be operated in the urgency mode, a control command for instructing the vehicle to transmit an increased amount of the vehicle environment data from the vehicle to the server is generated. When determined to be operated in the efficiency mode, a control command for instructing the vehicle to store the vehicle environment data and to selectively transmit the vehicle environment data based on at least two different data transmission standards is generated.

10 Claims, 6 Drawing Sheets

(56) References Cited

U.S. PATENT DOCUMENTS

| | | | |
|---|---|---|---|
| 2009/0140887 A1* | 6/2009 | Breed | G01S 17/86 |
| | | | 701/116 |
| 2013/0179007 A1* | 7/2013 | Dalum | B60L 1/006 |
| | | | 701/2 |
| 2013/0274950 A1 | 10/2013 | Richardson et al. | |
| 2015/0094888 A1* | 4/2015 | Hyde | B60L 53/65 |
| | | | 701/22 |
| 2015/0094957 A1* | 4/2015 | Hyde | B60L 53/52 |
| | | | 701/537 |
| 2015/0095789 A1* | 4/2015 | Hyde | B60L 53/305 |
| | | | 715/738 |
| 2015/0239454 A1* | 8/2015 | Sujan | F02D 29/02 |
| | | | 701/54 |
| 2017/0228258 A1* | 8/2017 | Shifman | H04L 67/10 |
| 2017/0245197 A1 | 8/2017 | Onishi et al. | |
| 2018/0007161 A1 | 1/2018 | Hwang et al. | |
| 2018/0106201 A1* | 4/2018 | Yuan | F02D 41/0087 |
| 2018/0204111 A1* | 7/2018 | Zadeh | G06N 3/0436 |
| 2018/0376357 A1* | 12/2018 | Tavares Coutinho | H04L 67/10 |
| 2019/0355258 A1 | 11/2019 | Kimura | |

FOREIGN PATENT DOCUMENTS

| | | |
|---|---|---|
| DE | 102013205392 A1 | 10/2014 |
| DE | 102016003969 A1 | 10/2017 |
| JP | 2011-158446 A | 8/2011 |
| JP | 2014-164316 A | 9/2014 |
| JP | 2015-31533 A | 2/2015 |

\* cited by examiner

CONTROL DEVICE AND CONTROL METHOD OF VEHICLE ENVIRONMENT DATA TRANSMISSION

CROSS REFERENCE TO RELATED APPLICATION

The present application claims the benefit of priority from Germany Patent Application No. 102019212312.0 filed on Aug. 16, 2019. The entire disclosure of the above application is incorporated herein by reference.

TECHNICAL FIELD

The present disclosure relates to a control device and a control method of vehicle environment data transmission.

BACKGROUND

There has been known a computer-implemented communication method between a processor system of a vehicle and a network for data transmission.

SUMMARY

A technology of controlling vehicle environment data transmission between a vehicle and a server is configured to receive mode information determining a mode among a monitoring mode, an urgency mode, or an efficiency mode. When determined to be operated in the monitoring mode, a control command for instructing the vehicle to perform a continuous monitoring or a regular monitoring of an environment of the vehicle is generated and a monitoring result from the vehicle is transmitted to the server. When determined to be operated in the urgency mode, a control command for instructing the vehicle to transmit an increased amount of the vehicle environment data from the vehicle to the server is generated. When determined to be operated in the efficiency mode, a control command for instructing the vehicle to store the vehicle environment data and to selectively transmit the vehicle environment data based on at least two different data transmission standards is generated.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
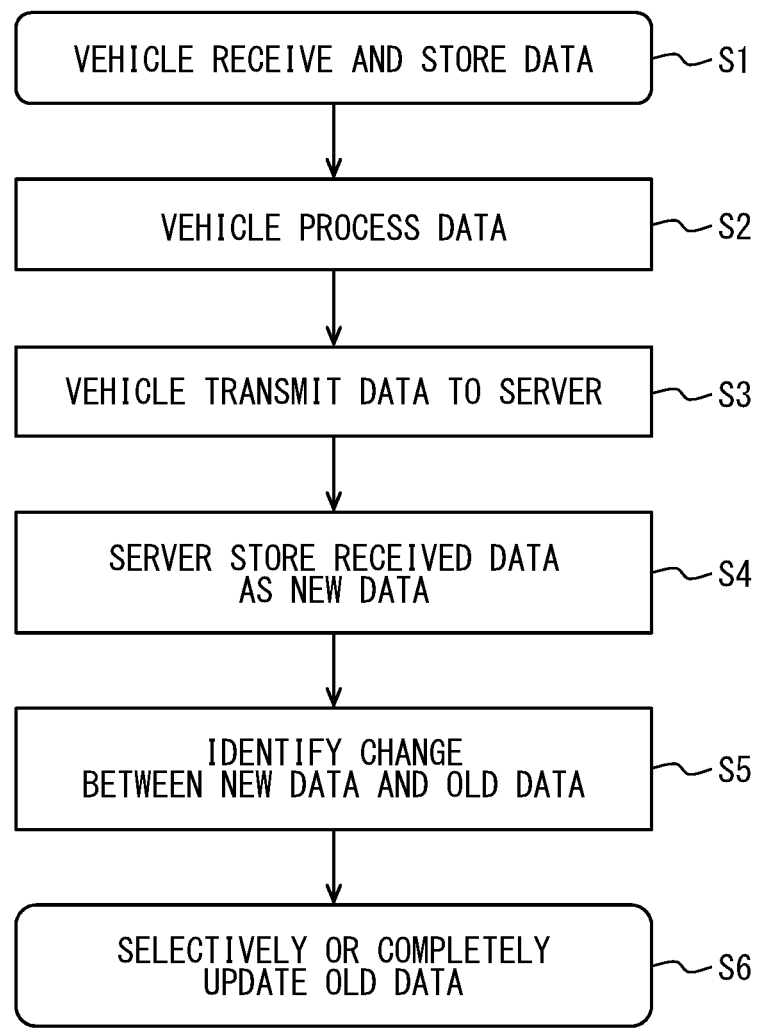
FIG. 1 shows an exemplary flow for the transmission of vehicle environment data between a vehicle and a server.

Various sensors are used in vehicles, e.g., cameras, sensors for radar and LIDAR, whereby large amounts of vehicle environment data are collected. This collected data can be used to update and improve maps and vehicle environment data used by other vehicles, e.g. for navigation and autonomous driving purposes. Particularly, autonomous driving requires the presence of highly accurate maps and the latest information of the vehicle environment. The challenge here is that information from other vehicles is used for services relating to one's own vehicle.

A known use is the application of vehicle environment data from sensors for updating maps or for detecting damages on the side of the road or for detecting parking spots, for example. In this case, a large amount of data is sent from vehicles to servers which collect this data. Thus, transmission of the data via existing wireless networks in continuous operation is not reasonable, neither for physical nor for economic reasons. A remedy is storing the data locally in the vehicle until a local and cost-efficient network with a high bandwidth, such as W-LAN, is available. However, these networks are only available sporadically, e.g., when the vehicle is parked at a location, such as at home. But this often leaves only small time windows, and in many cases, it is difficult to predict when WLAN spots will be reached.

Furthermore, it is not realistic, either, when all data recorded in the vehicle is stored, capacity shortage may arise in a storage space. One remedy could be to extract and store relevant data only, such as traffic signs, which requires less storage space. However, processing on board of the vehicle requires complex computing equipment and that other types of analysis of the recorded data than the ones performed in the vehicle are not possible. This requires selecting the data to keep when the storage space in the vehicle becomes scarce.

There has been known a computer-implemented method of connecting a processor system of a vehicle to a network for receiving data. To this end, the processor system is used to determine a route that is expected to be traveled by the vehicle. Furthermore, the method uses the processor system to determine a portion of the route that includes a buffering zone. The buffering zone includes an area in which the strength of the signal transmitted via the network meets a predetermined criterion. Based on a determination that the vehicle is within the buffering zone, data is pre-fetched from a source over the network. However, the route traveled by the vehicle must be known.

According to a first aspect of the present disclosure, a control device of a server, the control device controlling vehicle environment data transmission between at least one vehicle and the server independent of a movement of the at least one vehicle, the control device includes an input interface, a processing device, and an output interface. The input interface is configured to receive mode information determining a mode which the control device is to be operated in among three modes of the vehicle environment data transmission. The three modes includes a monitoring mode, an urgency mode, and an efficiency mode. The processing device is configured to execute a processing according to the mode information received by the input interface. The processing includes: (a) when the control device is determined to be operated in the monitoring mode according to the mode information, generating a control command for instructing the at least one vehicle to perform a continuous monitoring or a regular monitoring of an environment of the at least one vehicle and to transmit a monitoring result from the at least one vehicle to the server; (b) when the control device is determined to be operated in the urgency mode according to the mode information, generating a control command for instructing the at least one vehicle to transmit an increased amount of the vehicle environment data compared to the monitoring mode from the at least one vehicle to the server; and (c) when the control device is determined to be operated in the efficiency mode according to the mode information, generating a control command for instructing the at least one vehicle to store the vehicle environment data in the at least one vehicle and selectively transmit the vehicle environment data from the at least one vehicle to the server based on at least two different data transmission standards. The output interface is configured to transmit the control command generated by the processing device to the at least one vehicle.

The above control device allows performing the transmission of vehicle environment data in a manner adequate for the data situation and the data transmission standard available. In the monitoring mode, the road can be monitored at regular intervals, such as every 15 minutes, every one hour, or every two hours and thus to adjust the transmission of the amount of data to the use case. In the urgency mode, road accidents can be taken into account, for which image data are urgently required to evaluate the situation. Due to the urgency, the accident situation can then be adequately handled, for example, by a high data transmission rate, regardless of the communication cost. In the efficiency mode, for example if there is an accident on the side of the road, details are required but a high data rate entailing high costs is not. The data may be stored by vehicles, but data transmission itself can take place when a cost efficient data transmission standard is available. In this manner, all data for a specific area can be transmitted by all vehicles, but without time priority. After a predetermined period of time, all data is available at the server.

The present disclosure is not limited to one mode; instead, multiple modes can be used at the same time, that is, in parallel, in one vehicle, or another mode may be used in the case of two or more vehicles, for different types of data, such as image data and location data for road marking or for data of various locations from which the images originate, for example. The mode(s) can thus be selected depending on location. The advantage is that modes adjusted to the respective type of data or to the respective location of the vehicle, or location of the data collected, such as the location of the image, can efficiently make a comprehensive data image available on the server, even in parallel operation.

According to a second aspect of the present disclosure, which further develops the first aspect, the processing device is configured to execute the processing in at least two modes of the three modes or in one of the three modes.

The processing may be executed in a combination of at least two or three of the modes. If the processing device can execute two or all three modes, it is also possible to perform operation in the urgency mode and/or in the efficiency mode, in addition to the regular use case of operating in the monitoring mode. The control device can thus take into account different use conditions on the road for the server, and an adequate amount of transmitted data can be implemented.

According to a third aspect of the present disclosure, which further develops the first and second aspects, the increased amount of data is caused by a higher resolution of images taken by the vehicle relating to the vehicle environment or an increased frame rate of motion images taken by the vehicle relating to the vehicle environment.

As a result of the higher resolution or increased frame rate, e.g., in the event of an accident in the road, the response can be better coordinated and respective rescue vehicles can be provided.

According to a fourth aspect of the present disclosure, the vehicle environment data is transmitted from at least two vehicles to the server. The input interface is configured to record and transmit respective location information of the at least two vehicles to the processing device. The processing device is configured to, in the efficiency mode, instruct the at least two vehicles store the vehicle environment data when the at least two vehicles have similar or identical location information. The processing device is configured to, in the efficiency mode, instruct the at least two vehicles to transmit the stored vehicle environment data according to a predetermined data transmission standard when a data connection between the at least two vehicles and the server is available according to the predetermined data transmission standard. With this configuration, an accident on the side of the road can be documented using exact images, and transmission can take place at the time at which a data transmission standard with a high bandwidth is available. In this way, the information relating to the accident on the side of the road is cost efficiently sent to the server.

According to a fifth aspect of the present disclosure, a control device of a vehicle for controlling vehicle environment data transmission between the vehicle and a server independent of a movement of the vehicle includes an input interface, a processing device, and an output interface. The input interface is configured to receive mode information determining a mode which the control device is to be operated in among three modes including a monitoring mode, an urgency mode, and an efficiency mode. The processing device is configured to execute a processing according to the mode information received by the input surface. The processing includes: (a) when the control device is determined to be operated in the monitoring mode according to the mode information, generating the vehicle environment data based on a continuous monitoring or a regular monitoring of an environment of the vehicle; (b) when the control device is determined to be operated in the urgency mode, generating an increased amount of the vehicle environment data compared to the monitoring mode; and (c) when the control device is determined to be operated in the efficiency mode, storing the vehicle environment data in the vehicle and transmitting the vehicle environment data from the vehicle to the server according to at least two different data transmission standards. The output interface is configured to transmit the vehicle environment data generated by the processing device to the server.

The above control device of vehicle allows data transmission from the vehicle to the server in at least one of the monitoring mode, the urgency mode, and the efficiency mode, with the advantages mentioned above for each of the modes.

The present disclosure is not limited to one mode in the vehicle; instead, multiple modes can be used at the same time, that is, in parallel, in one vehicle, or another mode may be used in the case of the two or more vehicles, for different types of data, such as image data and location data for road marking or for data of various locations from which the images originate, for example. The mode(s) can thus be selected depending on location. The advantage is that modes adjusted to the respective type of data and the respective location of the vehicle or location of the collected data, such as to the location of the image, can efficiently make a comprehensive data image available in the vehicle, even in parallel operation.

According to a sixth aspect of the present disclosure, a control device for controlling vehicle environment data transmission between at least two vehicles and a server independent of movements of the at least two vehicles includes an input interface, a processing device, and an output interface. The input interface is configured to receive respective location information of the at least two vehicles with respect to a predetermined road segment. The processing device is configured to define at least two road sections on the predetermined road segment, assign, respectively, the at least two vehicles to the at least two road sections, and assign, to each of the at least two vehicles, a control command instructing each vehicle to transmit the vehicle environment data relating to the assigned road section to the server. The output interface is configured to transmit the control command generated by the processing device to each of the at least two vehicles.

With this configuration, receiving location information, information about the relative arrangement of road section and vehicle is available in the control device. In this way, representative vehicle environment data can be obtained relating to the road section. If for example multiple vehicles pass through the road segment, the amount of vehicle environment data can be reduced in that only one vehicle transmits the data in each of the road sections.

According to a seventh aspect of the present disclosure, which further develops the sixth aspect, the processing device is configured to control one of the at least two vehicles to store the vehicle environment data relating to one of the at least two road sections, and upon availability of a data connection between the one of the at least two vehicles and the server according to a predetermined data transmission standard, control the one of the at least two vehicles to transmit the stored vehicle environment data according to the predetermined data transmission standard.

With this configuration, the vehicle is not required to perform the data transmission when it is located in the road section. One application is, for example, that the vehicle, after receiving the vehicle environment data in a road section, waits for a time at which the vehicle is located within the range of a WLAN hot spot. Only at that time is the information relating to the road section transmitted to the control device for the server.

According to an eighth aspect of the present disclosure, a control method of vehicle environment data transmission between at least one vehicle and a server independent of a movement of the at least one vehicle includes: recording, by the server, mode information indicating one of three modes to be executed, the three modes including a monitoring mode, an urgency mode, and an efficiency mode; generating, by the server, a control command corresponding to the received mode information, the generating of the control command including: (a) in the monitoring mode, generating the control command which instructs a continuous monitoring or a regular monitoring of an environment of the at least one vehicle by the at least one vehicle and instructs a data transmission of a monitoring result as the vehicle environment data from the at least one vehicle to the server; (b) in the urgency mode, generating the control command which instructs a transmission of the vehicle environment data from the at least one vehicle to the server, the vehicle environment data having an increased amount compared to the monitoring mode; and (c) in the efficiency mode, generating the control command which instructs a storing of the vehicle environment data in the at least one vehicle and a selective transmission of the vehicle environment data from the at least one vehicle to the server according to at least two different data transmission standards; and transmitting, by the server, the generated control command to the at least one vehicle.

With this control method, it is possible to provide the server with data in accordance with the monitoring mode, urgency mode, and/or efficiency mode described above.

According to a ninth aspect of the present disclosure, which develops the eighth aspect further, the control method further includes: recording, by the server, location information that relates to locations of at least two vehicles; in the efficiency mode, storing respective vehicle environment data of the at least two vehicles that have similar or identical location information; and in the efficiency mode, when data links between the at least two vehicles and the server are available according to a predetermined data transmission standard, transmitting the stored respective vehicle environment data from the at least two vehicles to the server according to the predetermined data transmission standard.

With this control method, transmission of comprehensive vehicle environment data can take place at that time only at which the vehicle is located near a WLAN hot spot.

According to a tenth aspect of the present disclosure, control method of vehicle environment data transmission between at least two vehicles and a server independent of movements of the at least two vehicles includes: recording, by the server, respective location information of the at least two vehicles on a predetermined road segment; defining at least two road sections on the predetermined road segment; assigning the at least two vehicles to the at least two road sections, respectively; generating a control command corresponding to each of the at least two vehicles, the control command instructing a transmission time of the vehicle environment data, which is related to a corresponding road section of the predetermined road segment, from each of the at least two vehicles to the server; and transmitting the generated control command to each of the at least two vehicles.

With this control method, the amount of data to be transmitted from the vehicle to the server can be reduced, and storage space needed in the vehicle can also be reduced.

Control devices and control methods of vehicle environment data transmission between at least one vehicle and a server will be described in more detail below with reference to the exemplary embodiments.

To give an exemplary explanation of the use of the present disclosure, FIG. 1 refers to a typical flow for updating data in a server for use during a navigation and during an autonomous driving of a vehicle.

In S1, vehicle environment data which relates to and indicates an environment of a vehicle is received by the vehicle and stored in the vehicle. After receiving and/or storing the vehicle environment data, the vehicle environment data is processed in the vehicle in S2, for example to selectively extract information from the vehicle environment data. An example is the extraction of information relating to a speed limit on a traffic sign in image data. In S3, the received and/or stored and/or processed data is transmitted wirelessly from the vehicle to a server.

In S4, the data transmitted from the vehicle is stored in the server as new data. In S5, the new data transmitted from the vehicle is compared to an old data already stored in the server. The comparison may include, for example, a change in a speed limit in a road segment. Based on an identification of the change, the old data is selectively or completely updated in S6 with the new data transmitted from the vehicle.

Assuming that each vehicle in a road segment constantly transmits all received data to the server, the server constantly has a complete up-to-date image data of the road segment. The server can then transmit this data to another vehicle with high security with respect to navigation or autonomous driving. Thus, a high level of road safety can be secured.

Due to limited storage capacity and limited transmission bandwidth for the communication between the vehicle and the server, the comprehensive image data that includes data from all vehicles and is stored in the server cannot be kept forever. We assume that vehicles continuously stores data from multiple sensors and also gets derived or extracted information from this stored data, for example data relating to the environment model and the traffic signs.

This can result in a scenario that vehicles in the future will have to transmit 50 to 500 Mbps to the server and to store this data locally. This is difficult to implement economically over a long period of time with currently available storage solutions. Even mobile radio networks of modern standards, for example 5G, will not always have sufficient transmission bandwidth, particularly for the constant transmission of image data from multiple neighboring vehicles.

This situation may be different when the amount of data is small. For example, information about the route traveled and metadata with respect to sensors, such as the pure location data relating to a vehicle, can be transmitted from the vehicle to the server at a low bandwidth. Such a data connection can also be implemented for a long period of time with acceptable data security. For transmitting image data, data connection with a high bandwidth, such as the connection between a vehicle and a WLAN hot spot may be needed. The WLAN hot spot is only available at a selected location, such that only a sporadic data connection via WLAN is possible between the vehicle and the server. As a result, data must be stored in the vehicle, and data needs to be deleted if there is lack of storage space. This time offset and data deletion, however, should not impair the functionality of navigation and autonomous driving, which is ensured via the server. This is a challenge of the present disclosure.

Compared with a configuration in which an already known future route of a vehicle is used, in the present disclosure, currently available data and stored data is used. According to another aspect of the present disclosure, stored data and current data from multiple vehicles are used.

Starting at this point, a server side can consider the following: In many cases, the server already has available maps or geographical data, as well as some input data. For example, the server can resort to data obtained from communicating with vehicles in the past. Furthermore, the server can associate geographical areas, which hereinafter will be referred to as road sections, with existing map data.

In many cases, the server continuously receives metadata from vehicles, such as data relating to the road on which the vehicles travel and information on new data from sensors or on data that has been deleted. Thus the server knows the data available at the vehicle and the requirements with respect to continuous updating of data.

First Exemplary Embodiment

A control device and a control method according to a first exemplary embodiment of the present disclosure will be described below with reference to FIG. 2, FIG. 3A, FIG. 3B, and FIG. 4.

Figure 2:
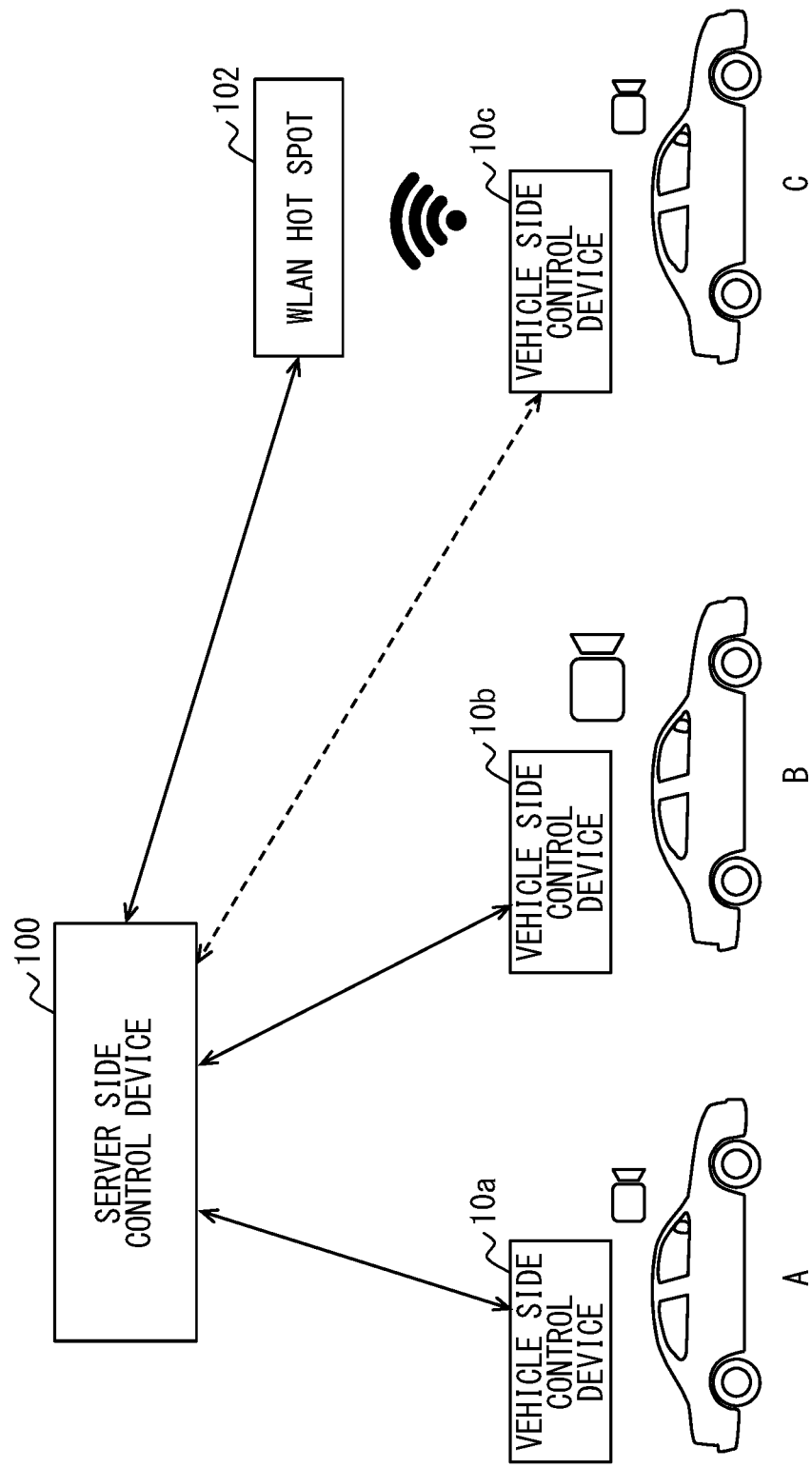
FIG. 2 shows a communication between a control device of a server and control devices in the vehicles according to a first exemplary embodiment.

FIG. 2 shows a system of a control device of a server and control devices of vehicles. The control device of server is also referred to as server side control device, and the control device of the vehicle is also referred to as a vehicle side control device. More precisely, FIG. 2 shows vehicles A, B, and C at different positions along a road segment. These vehicles A, B, and C do not have to be different vehicles, these vehicles may also be the same vehicle at different points of time.

The interaction between the vehicle and the server is shown using the example of vehicle A. Vehicle A has a control device 10a and one or more sensors, exemplified by a camera icon, for image recording. The control device 10a of the vehicle A is capable of performing a wireless communication with a control device 100 of a server. This communication may take place via a mobile radio network according to, for example, 4G or 5G standard.

A dashed communication line is shown in FIG. 2 between the control device 10c of vehicle C and the control device 100 of server. The dashed line is meant to indicate that, unlike the data transmission between the control device 10a and the control device 100, only metadata such as location information is transmitted to the vehicle between the control device 10c and the control device 100. The control device 10c is connected to a transmitter by which the control device 10c establishes a wireless communication via a WLAN network with a WLAN hot spot 102. This WLAN hot spot 102 is also connected to the control device 100 of server. WLAN communication between the control device 10c and the WLAN hot spot 102 allows exchanging greater amount of data, such as image data or motion image data or data having a high frame rate between the vehicle C and the control device 100 of server.

The camera icon for the sensor of vehicle B is larger than others in FIG. 2. This indicates higher frame rates and a greater amount of data. More precisely, vehicle B shows a situation in which a vehicle is required to immediately transmit multiple image information, for example, from a location of an accident occurred on the road. In this case, an extraordinary situation exists in the use of a high bandwidth for the mobile radio connection between the control device 10b and the control device 100 of server is required.

The system shown in FIG. 2 indicates the following circumstances. A vehicle can transmit data based on priority and cost, i.e. bandwidth and energy costs, or it can delete data in the vehicle. Data with high priority is sent first when data transmission to the control device 100 of server is possible. Condition can be defined for bandwidth and amount of data, for example, until what time a mobile radio network may be used for such data transmission. Urgent data, for example in the event of a road accident, is transmitted immediately, without considering bandwidth limitation. Contrary to that, data with a lower priority and requiring lower costs, that is, use of a less costly communication standard, can be sent later when costs can be reduced, for example, when it can be expected that a WLAN hot spot will be within range of the wireless network of the vehicle at a later time. In this case, the data is not deleted until it is sent via the less costly communication standard.

Figure 3A:
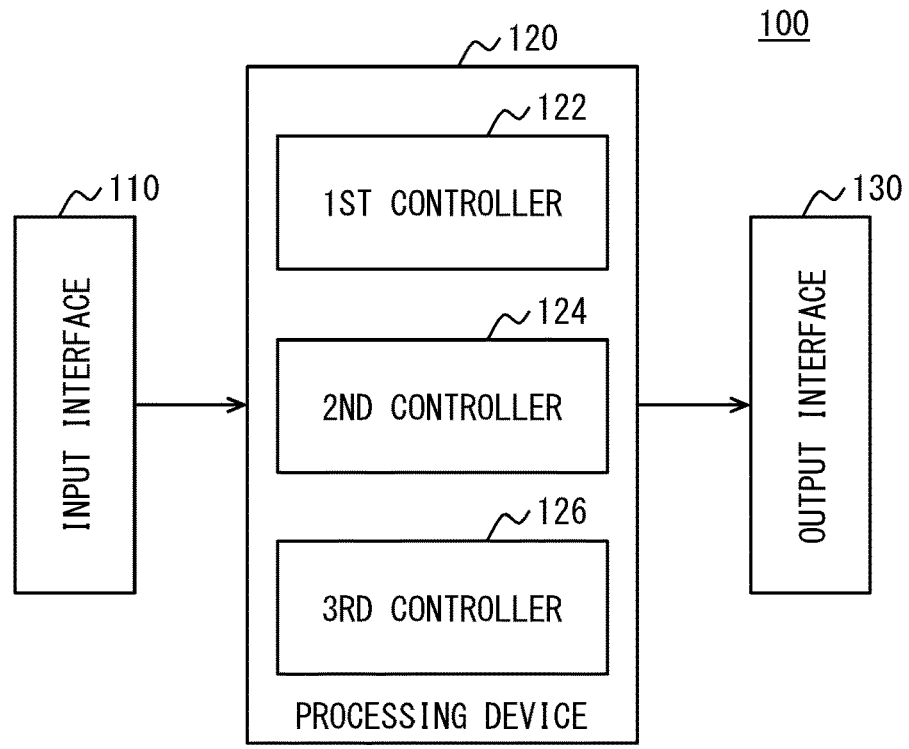
FIG. 3A shows a structure of a control device of a server.

In the first exemplary embodiment, the control device 100 of server may be configured to continuously or periodically send information to the vehicles regarding which data has a high priority, which data to send optimized by priority and cost, and which data to send urgently. To this end, the control device 100 of server, which is schematically shown in FIG. 3A, includes an input interface 110, an output interface 130, and a processing devise 120 arranged between the input interface 110 and the output interface 130. The processing device 120 includes a first controller 122 for the monitoring mode, a second controller 124 for the urgency mode, and a third controller 126 for the efficiency mode.

Figure 3B:
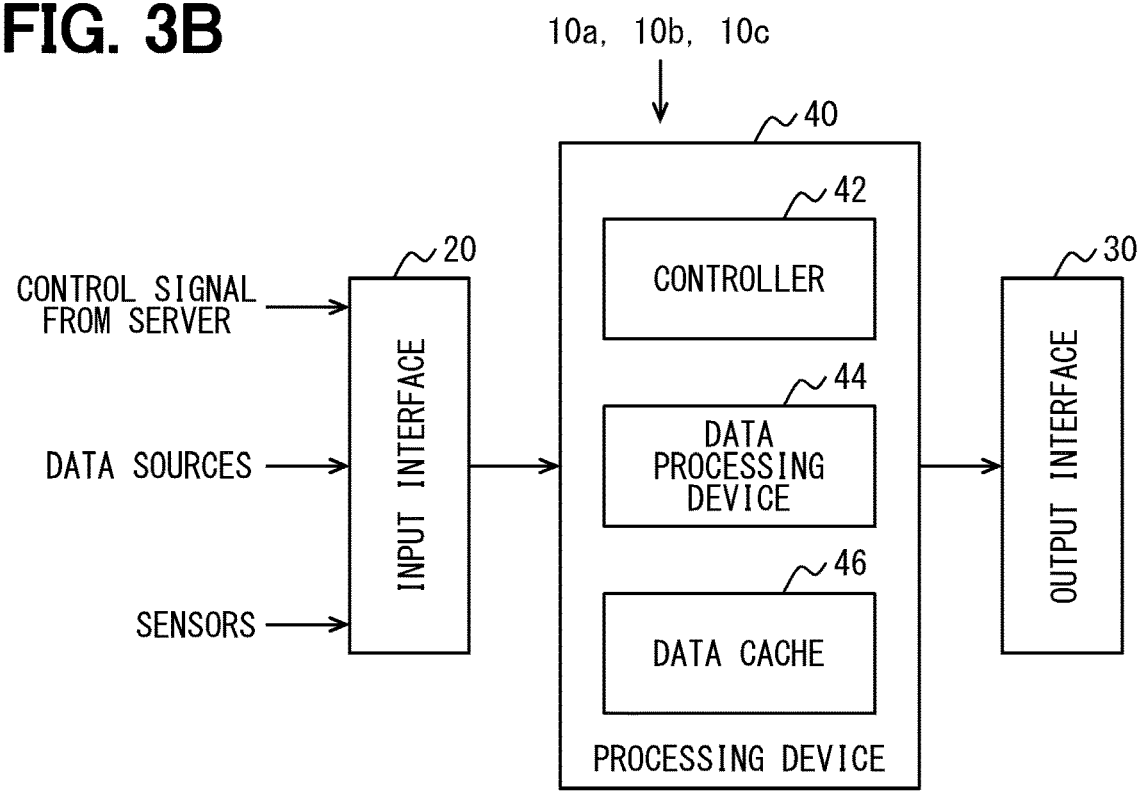
FIG. 3B shows a structure of a control device of a vehicle.

FIG. 3B shows an example of a control device 10a, 10b, or 10c of the vehicle. The control device of vehicle includes an input interface 20, a processing device 40, and an output interface 30. The input interface receives signals from sensors in the vehicle, such as a camera and distance measuring devices. The data source of the input interface 20 may be, for example, driver assistance system. The processing device 40 receives a control signal from the server via the input interface.

The processing device 40 includes a controller 42, which particularly functions as a controller in the vehicle for the monitoring mode, the urgency mode, and the efficiency mode in accordance with the control signal from the server. The processing device 40 includes a data processing device 44 which processes sensor data and data from data sources in such a way that derived data can be formed. An example is the detection of traffic signs, such as speed limits, on the side of the road. The processing device 40 includes an intelligent data cache 46 that handles the prioritization for storing and deleting data in accordance with the control signal from the server and performs a respective memory management. Data generated by the processing device 40 is transmitted via the output interface 30 to the control device 100 of server.

Figure 4:
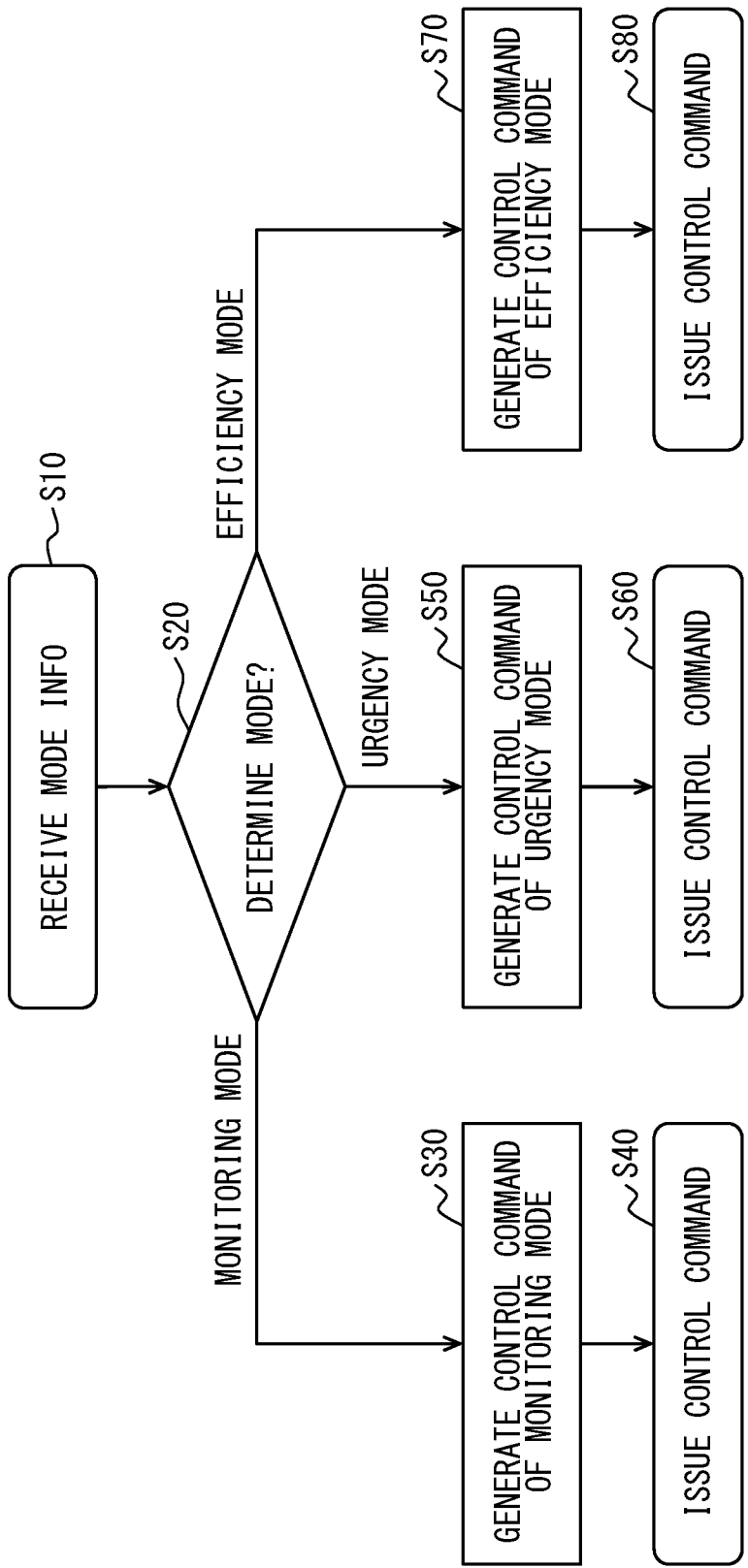
FIG. 4 shows a flowchart of a control method according to the first exemplary embodiment.

FIG. 4 shows a flowchart of the control method according to the first exemplary embodiment. Vehicle A shown in FIG. 2 is assigned the monitoring mode, vehicle B shown in FIG. 2 is assigned the urgency mode, and vehicle C shown in FIG. 2 is assigned the efficiency mode.

The first controller 122 in FIG. 3A for the monitoring mode represents the basic case of the communication between the control device 100 of server and the control device of vehicle, for example, the control device 10a. The road is monitored at regular intervals or continuously, for example, every 5 minutes or every 15 minutes, or every one hour. The resulting transmission activity takes the communication standard used between the control device 10a and the control device 100 of server into account. Using the monitoring mode, the control device 100 of server regularly receives information relating to the vehicle environment of vehicle A. The information relating to the vehicle environment is also referred to as vehicle environment information.

In FIG. 2, the urgency mode is exemplified by vehicle B. In the urgency mode, there is an urgent need for immediate transmission of data, for example, in the event of a road accident. Particularly, details are of interest here, and a large amount of data is desired. In this case, a control command from the control device 100 of server can get to one or more vehicles that a high data density is to be generated immediately for the respective vehicle environment. When the control command is sent to one or more vehicles, the server can particularly analyze a specific area around the accident.

The efficiency mode, which is shown by vehicle C in FIG. 2, also requires all data which has less urgency. In this case, it is helpful to wait until a high bandwidth is available for the communication between the vehicle C and the control device 100 of server. This is the case for the connection to the WLAN hot spot 102 mentioned above, which is in communication with the control device 100 of server. A use case is an accident on the side of the road which does not represent a current obstruction to road traffic. In the event of the efficiency mode, the server can transmit a control command for providing evidence data with a lower priority via own control device 100. In other words, all data for a specific area is to be made available in a non-urgent time frame. While the data can be transmitted at a later time, care has to be taken that this data is not deleted.

FIG. 4 shows a flowchart of a control method according to the first exemplary embodiment. The control device 100 of server receives information relating to mode via the input interface 110 in S10. The information relating to the mode is also referred to as mode information. In S20, the control device 100 determines the mode based on the received mode information. When the mode is determined as the monitoring mode, the control device 100 proceeds to S30. In the monitoring mode, the control device 100 generates a control command of the monitoring mode and issues the control command in S40. In S50, the control device 100 generates a control command of the urgency mode when there is a need for urgency and issues the control command in S60. When the received mode information relates to the efficiency mode, the control device 100 generates a control command of the efficiency mode in S70, and issues the control command in S80.

As a result, in the first exemplary embodiment, the required data is available to the server via the control device 100 of server. The control device 100 of server is able to obtain the data in the regular case (monitoring mode), in the case of immediate necessity of large amounts of data (urgency mode), or in the case of requiring all data with a lesser time priority (efficiency mode).

The first exemplary embodiment is, in principle, a reverse content delivery network. More precisely, a content delivery network (CDN) is geographically distributed network of proxy servers and their data centers which allows high availability and performance, particularly for transmitting static content on the internet. In the reverse content delivery network according to the present disclosure, the network load can be reduced by buffering the data in vehicles and transmitting the data to the server upon request from the server.

Similar data can thus be uploaded only once, which is ensured by the time delay for data reception, particularly in the monitoring mode. Loads may be distributed among vehicles, since only relevant vehicles provide data based on the requests. Furthermore, a later cost efficient data transmission process between the vehicle and the server is possible through data transmission in the efficiency mode.

Second Exemplary Embodiment

Figure 5:
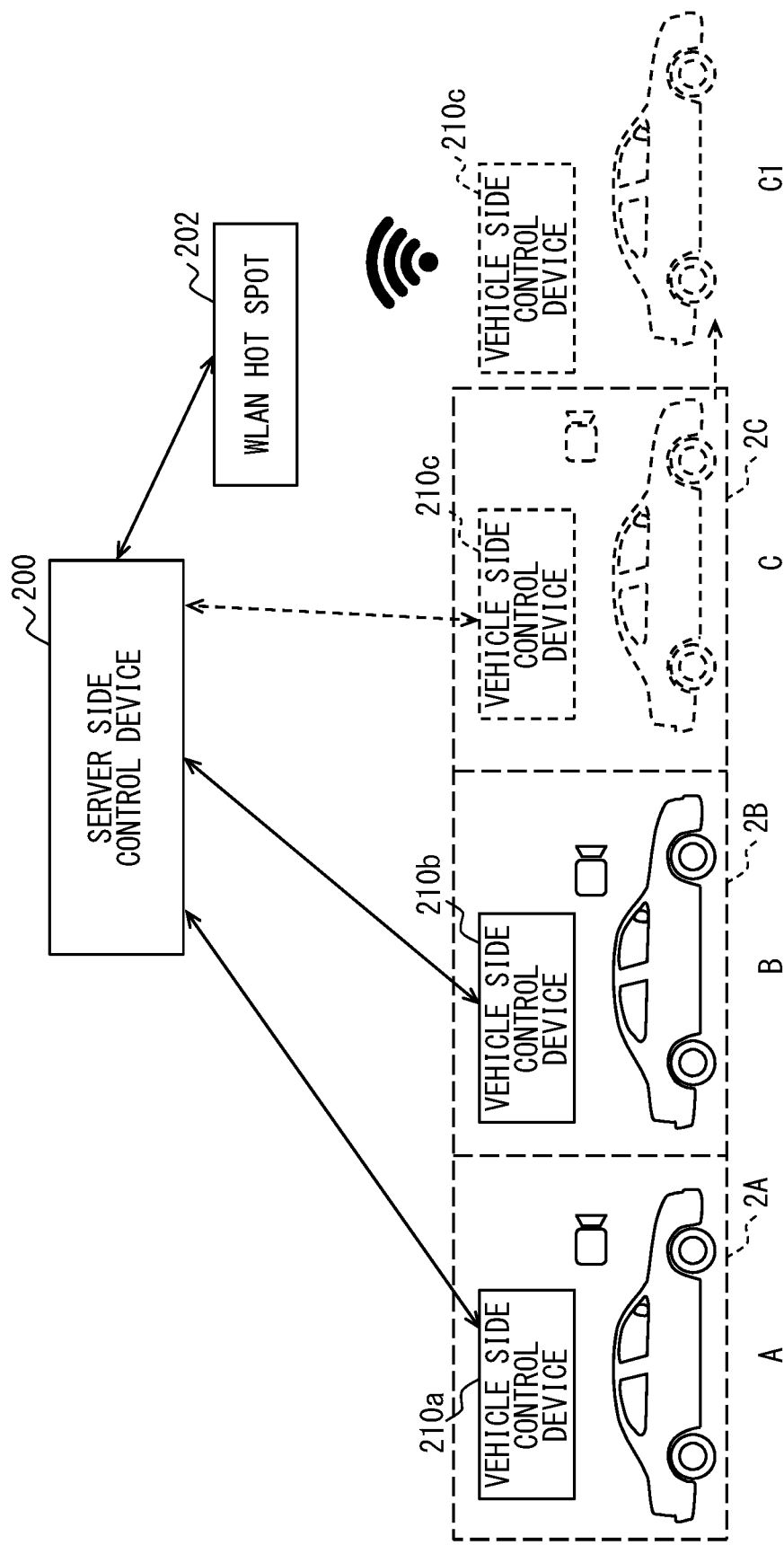
FIG. 5 shows a communication between a control device of a server and control devices in the vehicles according to a second exemplary embodiment.
Figure 6:
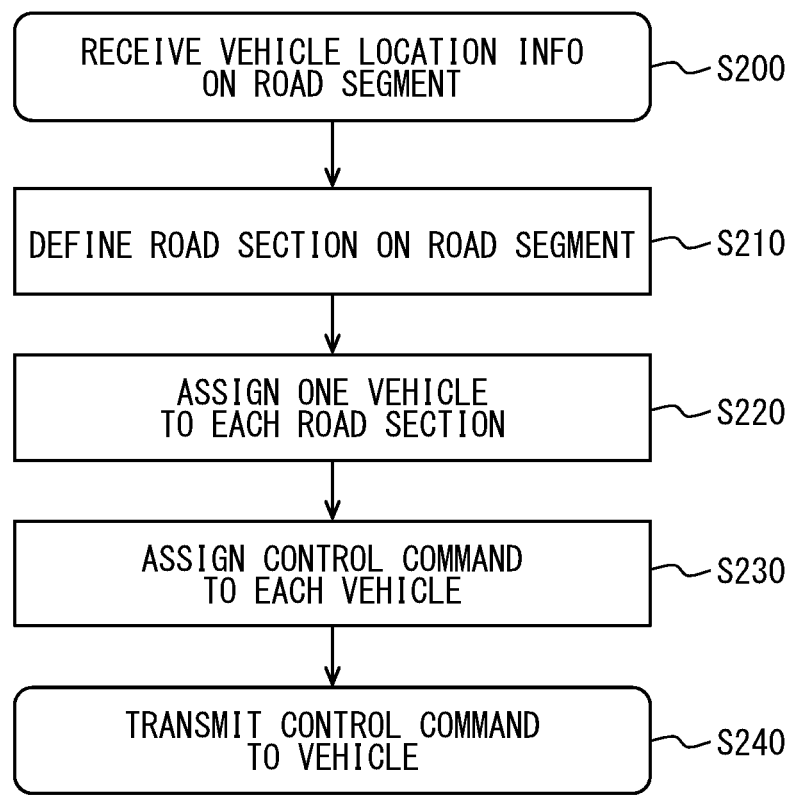
FIG. 6 shows a flowchart of a control method according to the second exemplary embodiment.

FIG. 5 shows a system of control devices of server and vehicle, and FIG. 6 shows a flowchart of a control method according to a second exemplary embodiment.

FIG. 5 according to the second exemplary embodiment shows a control device 200 of server and multiple vehicles A, B, and C located in respective road segments 2A, 2B, 2C. The control device 200 of server may have the structure shown in FIG. 3A. However, the controllers 122, 124, and 126 do not need to be provided in the present embodiment. The control devices 210a, 210b, 210c may have similar structure shown in FIG. 3B. However, in the present embodiment, the controller 42 may be, but does not have to be, set up for the monitoring mode, the urgency mode, or the efficiency mode. The difference between the system shown in FIG. 2 according to the first exemplary embodiment and in FIG. 5 according to the second exemplary embodiment is that the control device 200 of server divides a road segment into multiple road sections 2A, 2B, and 2C.

Compared to the first exemplary embodiment, a configuration of the second exemplary embodiment is able to flexibly and efficiently support data collection from multiple vehicles. Optimization can be performed in various dimensions. When optimizing with respect to the time of data transmission, the time when the data is transmitted has flexibility. This is for example shown in vehicle C and its movement from out of the road section 2C to the vehicle C1. The vehicle C1 can communicate via WLAN with the WLAN hot spot 202. In the second exemplary embodiment, the entire amount of data is not sent to the control device 200 of server each time for every travel of a vehicle through the road sections 2A, 2B, and 2C from every vehicle to reduce expenditure. Instead, the control device 200 of server ensures that each segment 2A, 2B, 2C is assigned with only one vehicle A, B, C and collects vehicle environment data from the assigned vehicles. In the case of vehicle C, data can be transmitted even more cost efficiently, since instead of the WLAN hot spot 202, the mobile radio standard is used as communication standard for the communication between the control device 210c and the control device 200 of server. Thus, the communication cost can be reduced.

The basic idea of the system according to the second exemplary embodiment can be combined with aspects of the first exemplary embodiment. For example, in road sections of increased interest, for example, in the road section 2B, data collection is requested not only from vehicle B but also from vehicle A. In this way, increased demand for information by the control device 200 of server in segment 2B can be achieved.

A system according to the second exemplary embodiment can also be modified in various manners. For example, 10 vehicles are traveling on a road of 10 kilometers at a specific time. Half of the vehicles may save the first 5 kilometers, and the other half of the vehicles may save the remaining 5 kilometers. When the probability of a later data transmission, e.g., via a WLAN hot spot 202, is high, or when a lack of storage space for storing data in the vehicles is expected, a command can be sent to each vehicle to store only one of 10 kilometers.

A control method according to the second exemplary embodiment is shown in FIG. 6. In S200, the control device 200 of server receives location information of the vehicles relating to the road segment. In S210, road sections are defined on the road segment. In S220, one vehicle is assigned to each road section of the road segment. In S230, a control command is assigned to each vehicle for transmission time points of vehicle environment data from the vehicle to the server. In S240, the control commands are transmitted to the vehicles. This ensures that multiple vehicles are assigned to respective road sections 2A, 2B, and 2C in FIG. 5, and also ensures data transmission to the control device 200 of server.

Third Exemplary Embodiment

The present disclosure is not limited to the first and second exemplary embodiments and a combination thereof. Instead, the present disclosure can also be executed in a third exemplary embodiment, which can optionally be coupled with one or both of the first and second exemplary embodiments.

In the first and second exemplary embodiments, the server, which may be configured as a cloud service, is required to have exact and complete vehicle environment data in order to improve maps and to better detect surrounding situations, such as free parking spots, and to respond to modified vehicle environment data, such as a modified number of people in the road.

During a basic data communication between the vehicle and the server, the server knows which vehicles receive data and which data can with some probability be expected to be transmittable at a later time. For example, in the case where lack of storage space in the vehicle is expected, the control device of server may generate control command to the vehicle for deleting data since the control device of server can expect that complete data will be available at a later time. Alternatively, the data with the lowest priority may be deleted first when a lack of storage space is expected. In addition, data already transmitted can be deleted if it is not required for the operation of the vehicle.

In the third exemplary embodiment, the vehicles are instructed via control commands to transmit data via a channel with a low bandwidth, assign priority to the collected data, or delete the collected data. This is aimed at keeping the most relevant data, and in this way there is the option to transmit this data at a later time, for example, via WLAN. Furthermore, more relevant data can also be transmitted with priority or by other devices, such as mobile devices, or communication units arranged along the road.

In the control method according to the third exemplary embodiment, the control device of server can either entirely or at least partially decide which data has priority and which data is to be deleted.

The following control method can be applied:
1. Vehicles send location information continuously to the control device of server, and the vehicles record data locally.
2. When a lack of storage space is imminent or can be expected in the near future, the vehicle receives instruction from the server which data has a higher priority, which data has a lower priority, and which data is to be deleted first. Alternatively, the server may transmit only priority data to the vehicle in advance, and the vehicle decides in the respective moments in which there is a lack of storage space or lack of storage space is expected, which data to delete or which data to transmit in another way, e.g., to other vehicles of units on the side of the road.
3. When a high-speed network is available, some of the data is transmitted by the vehicle based on the specified priority. Likewise, data can be transmitted to other devices, from which it will be forwarded to the server at a later time, such as via other vehicles, mobile devices, or communication units on the side of the road.

A control device and a control method according to the third exemplary embodiment can be used to reduce unnecessary storage and transmission. Thus, the control device and the control method according to the third exemplary embodiment increase the probability that relevant data is available on the server. Furthermore, load distribution among vehicles can be improved, and the probability that as much data as possible is transmitted can be increased. The control device or the control method according to the third exemplary embodiment are more flexible, since the route of the vehicle is not required to be known in advance. Furthermore, data is only deleted when necessary, keeping a maximum amount of data available.

When evaluating the priority and generating the control command, the server can also use data from other vehicles, for example, the probability that another vehicle enters a road section of a road segment, and other criteria, such as a request for specific data, can be addressed immediately. Various strategies aimed at having specific data available in a specific group of vehicles can be applied through control via the server, which may be available as a cloud service, such that the probability that data can be transmitted fast and/or completely from one of these vehicles can be increased.

The control devices and control methods of the first to third exemplary embodiment can thus be used to efficiently transmit data, particularly image data from a specific location, to identify changes in map data available on a server, such as damage to the road or construction sites, and to update the maps. These updated maps can then again be made available to the vehicles, including those that contributed to updating the data.

In the present disclosure, the processing device of vehicle side control device or server side control device may be implemented by a processor or a microcomputer. Alternatively, the processing device may be implemented as one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits.

What is claimed is:

1. A control device of a server, the control device controlling vehicle environment data transmission between at least one vehicle and the server independent of a movement of the at least one vehicle, the control device comprising:
   an input interface configured to receive mode information determining a mode which the control device is to be operated in among three modes of the vehicle environment data transmission, the three modes including a monitoring mode, an urgency mode, and an efficiency mode;
   a processing device configured to execute a processing according to the mode information received by the input interface, the processing including:
     (a) when the control device is determined to be operated in the monitoring mode according to the mode information, generating a control command for instructing the at least one vehicle to perform a continuous monitoring or a regular monitoring of an environment of the at least one vehicle and to transmit a monitoring result from the at least one vehicle to the server;
     (b) when the control device is determined to be operated in the urgency mode according to the mode information, generating a control command for instructing the at least one vehicle to transmit an increased amount of the vehicle environment data compared to the monitoring mode from the at least one vehicle to the server; and
     (c) when the control device is determined to be operated in the efficiency mode according to the mode information, generating a control command for instructing the at least one vehicle to store the vehicle environment data in the at least one vehicle and to selectively transmit the vehicle environment data from the at least one vehicle to the server based on at least two different data transmission standards; and
   an output interface configured to transmit the control command generated by the processing device to the at least one vehicle.

2. The control device according to claim 1, wherein the processing device is configured to execute the processing corresponding to at least two of the three modes or corresponding to one of the three modes.

3. The control device according to claim 1, wherein the vehicle environment data having the increased amount in the urgency mode includes a high resolution image or a high frame rate image of vehicle environment taken by the at least one vehicle.

4. The control device according to claim 1, wherein
   the vehicle environment data is transmitted from at least two vehicles to the server,
   the input interface is configured to record and transmit respective location information of the at least two vehicles to the processing device,
   the processing device is configured to, in the efficiency mode, instruct the at least two vehicles store the vehicle environment data when the at least two vehicles have similar or identical location information, and
   the processing device is configured to, in the efficiency mode, instruct the at least two vehicles to transmit the stored vehicle environment data according to a predetermined data transmission standard when a data connection between the at least two vehicles and the server is available according to the predetermined data transmission standard.

5. A control device of a vehicle, the control device controlling vehicle environment data transmission between the vehicle and a server independent of a movement of the vehicle, the control device comprising:
   an input interface configured to receive mode information determining a mode which the control device is to be operated in among three modes including a monitoring mode, an urgency mode, and an efficiency mode;
   a processing device configured to execute a processing according to the mode information received by the input surface, the processing including:
     (a) when the control device is determined to be operated in the monitoring mode according to the mode information, generating the vehicle environment data based on a continuous monitoring or a regular monitoring of an environment of the vehicle;
     (b) when the control device is determined to be operated in the urgency mode, generating an increased amount of the vehicle environment data compared to the monitoring mode; and
     (c) when the control device is determined to be operated in the efficiency mode, storing the vehicle environment data in the vehicle and transmitting the vehicle environment data from the vehicle to the server according to at least two different data transmission standards; and
   an output interface configured to transmit the vehicle environment data generated by the processing device to the server.

6. A control device controlling vehicle environment data transmission between at least two vehicles and a server independent of movements of the at least two vehicles, the control device comprising:
   an input interface configured to receive respective location information of the at least two vehicles with respect to a predetermined road segment;
   a processing device configured to
     define at least two road sections on the predetermined road segment,
     assign, respectively, the at least two vehicles to the at least two road sections, and
     assign, to each of the at least two vehicles, a control command instructing each vehicle to transmit the vehicle environment data relating to the assigned road section to the server; and
   an output interface configured to transmit the control command generated by the processing device to each of the at least two vehicles.

7. The control device according to claim 6, wherein the processing device is configured to
- control one of the at least two vehicles to store the vehicle environment data relating to one of the at least two road sections, and
- upon availability of a data connection between the one of the at least two vehicles and the server according to a predetermined data transmission standard, control the one of the at least two vehicles to transmit the stored vehicle environment data according to the predetermined data transmission standard.

8. A control method of vehicle environment data transmission between at least one vehicle and a server independent of a movement of the at least one vehicle, the control method comprising:
- recording, by the server, mode information indicating one of three modes to be executed, the three modes including a monitoring mode, an urgency mode, and an efficiency mode;
- generating, by the server, a control command corresponding to the received mode information, the generating of the control command including:
  - (a) in the monitoring mode, generating the control command which instructs a continuous monitoring or a regular monitoring of an environment of the at least one vehicle by the at least one vehicle and instructs a data transmission of a monitoring result as the vehicle environment data from the at least one vehicle to the server;
  - (b) in the urgency mode, generating the control command which instructs a transmission of the vehicle environment data from the at least one vehicle to the server, the vehicle environment data having an increased amount compared to the monitoring mode; and
  - (c) in the efficiency mode, generating the control command which instructs a storing of the vehicle environment data in the at least one vehicle and a selective transmission of the vehicle environment data from the at least one vehicle to the server according to at least two different data transmission standards; and
- transmitting, by the server, the generated control command to the at least one vehicle.

9. The control method according to claim 8, further comprising:
- recording, by the server, location information that relates to locations of at least two vehicles;
- storing respective vehicle environment data of the at least two vehicles that have similar or identical location information in the efficiency mode; and
- when data links between the at least two vehicles and the server are available according to a predetermined data transmission standard, transmitting the stored respective vehicle environment data from the at least two vehicles to the server according to the predetermined data transmission standard in the efficiency mode.

10. A control method of vehicle environment data transmission between at least two vehicles and a server independent of movements of the at least two vehicles, the control method comprising:
- recording, by the server, respective location information of the at least two vehicles on a predetermined road segment;
- defining at least two road sections on the predetermined road segment;
- assigning the at least two vehicles to the at least two road sections, respectively;
- generating a control command corresponding to each of the at least two vehicles, the control command instructing a transmission time of the vehicle environment data, which is related to a corresponding road section of the predetermined road segment, from each of the at least two vehicles to the server; and
- transmitting the generated control command to each of the at least two vehicles.

* * * * *